Nov. 24, 1970 3,542,536

METHOD OF FORMING OPTICAL WAVEGUIDE BY
IRRADIATION OF DIELECTRIC MATERIAL

Filed Sept. 1, 1967 3 Sheets-Sheet 1

United States Patent Office 3,542,536
Patented Nov. 24, 1970

3,542,536
METHOD OF FORMING OPTICAL WAVEGUIDE BY IRRADIATION OF DIELECTRIC MATERIAL
Richard P. Flam, Smithtown, and Eugene R. Schineller, Huntington Station, N.Y., and Donald W. Wilmot, Nashua, N.H., assignors to Hazeltine Research, Inc., a corporation of Illinois
Filed Sept. 1, 1967, Ser. No. 665,112
Int. Cl. C03c 19/00
U.S. Cl. 65—111
21 Claims

ABSTRACT OF THE DISCLOSURE

A method of fabricating optical waveguides by irradiating a block of a single continuous quantity of solid optical dielectric material so as to produce atomic displacements in an interior localized region, with a dose sufficient to produce a change in the refractive index of this interior localized region of the dielectric. A beam of protons of sufficient energy causes an increase in the refractive index in this interior localized region of a block of fused silica. This area of increased refractive index serves as the core while the remainder of the block serves as the cladding of the waveguide. Several discrete waveguides can be fabricated in one block of dielectric material by masking the irradiated surface to form several separate sections of higher refractive index for a beam of given energy and/or separate waveguides can be formed at different depths of the dielectric material by varying the incident energy of the protons in discrete steps.

---

The invention described herein was made in the performance of work under a NASA contract subject to the provisions of Section 305 of the National Aeronautics and Space Act of 1958, Public Law 85–568 (72 Stat. 435; 42 U.S.C. 2457).

BACKGROUND OF THE INVENTION

The present invention relates to a process for fabricating optical waveguides and waveguide components. More particularly, the invention relates to the method of fabricating optical waveguides by irradiating solid optical dielectric material with a beam of protons, for example, to produce a change in the refractive index of a localized region of the dielectric material. As used in the specification, the term "optical waveguide" refers to a system of material boundaries capable of guiding waves of optical energy. The term, therefore, includes both fiber optic "light pipes" which are highly multimode and waveguides wherein optical energy is transmitted in a single mode or selected low order electromagnetic modes. As used herein, the terms "optical" and "optical energy" include the infrared, visible and ultraviolet portions of the electromagnetic spectrum.

DESCRIPTION OF THE PRIOR ART

Optical waveguides have many industrial and commercial applications. For example, fiber optic faceplates are employed on oscilloscopes to transmit the image to the front surface of the cathode-ray tube to facilitate photographing the image. Tapered fiber optic faceplates have also been used to provide image magnification. Bundles of "light pipes" generally are employed to transmit images from one point to another to facilitate viewing or detection of an image.

The recent development of the laser provides a source of coherent radiation at optical frequencies and another use for optical waveguides; more specifically, waveguides that propagate optical energy in a single mode or controlled low order modes. Contemplated applications of the coherent light provided by the laser may include optical systems similar to radar and communications systems operating at microwave frequencies. However, to achieve the sophistication in counterpart optical systems, it may be necessary to provide a basic building block— a waveguide that transmits optical energy in a single or controlled low order modes. Conventional "light pipes" are highly multimode and generally there is no consideration of mode propagation in their design. However, by proper design it is possible to construct single mode optical waveguides. As with "light pipes" these waveguides are generally constructed from two optical dielectric materials consisting of a core and a cladding of lower refractive index than the core. By proper selection of the size and shape of the core and the difference of the refractive indexes of the materials used, single mode optical waveguides can be constructed. However, macroscopic single mode optical waveguides of this type require dielectric materials with a very small difference in refractive index, of the order of one ten-thousandth. If the refractive index is increased the size of the core must be decreased to the point where it is macroscopic, obviously increasing the difficulty of fabrication. As for multimode "light pipes" fabrication of a bundle of tightly packed fibers requires several comparatively complex processing steps.

SUMMARY OF THE INVENTION

Objects of this invention therefore are to provide new and improved methods of fabricating optical waveguides and methods of fabricating a plurality of optical waveguides from a single piece of dielectric material.

In accordance with the invention the method of fabricating an optical waveguide comprising the step of providing a single continuous quantity of solid optical dielectric material and the step of changing the refractive index in an interior localized region of the quantity of solid optical dielectric material by irradiating the dielectric material so as to produce atomic displacements in the localized region, with a dose sufficient to produce a difference in refractive index between the interior localized region and the remainder of the material which permits the guiding of optical energy.

BRIEF DESCRIPTION OF THE DRAWINGS

In the drawings.

FIG. 1 is an illustration of an optical waveguide consisting of a core region 20 having a transverse dimension $d$ and a cladding 21. The theory of operation and design criteria of optical waveguides is completely explained in the copending application of Robert A. Kaplan, Ser. No. 318,970, filed Oct. 25, 1963, and now U.S. Patent 3,386,-787, entitled "Macroscopic Optical Waveguides" and it will be briefly summarized below in conjunction with the description of FIGS. 2 and 3.

The definitions of the symbols used in the following discussion are listed below in a single listing for convenience of reference.

Figure 1:
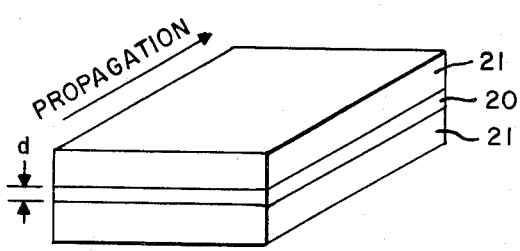
FIG. 1 is an illustration of an optical waveguide.

$\theta$ = angle of incidence
$\theta_c$ = critical angle
$\lambda$ = free-space wavelength
$d$ = thickness (or diameter)
$D_m$ = critical thickness for mode of order m
$n_1$ = refractive index of core region
$n_2$ = refractive index of outer region
$\Delta n = n_1 - n_2$
$m$ = constant related to the mode involved (m equals the mode number for FIG. 1 type waveguide. For FIG. 4 type waveguides $m$ is equal to the $p$th root of the $n$th order Bessel function and is tabulated in the above-referenced copending application.)

Figure 2:
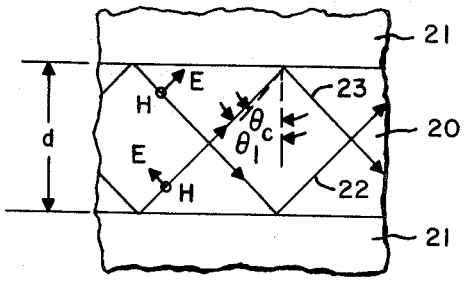
FIGS. 2 and 3 are diagrams useful in the principles and operation of the FIG. 1 waveguide.
Figure 3:
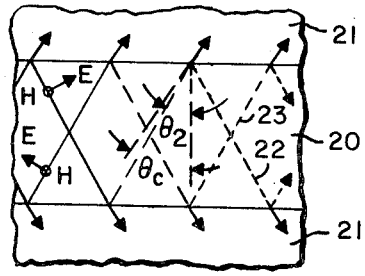

FIGS. 2 and 3 are expanded side views of a portion of the FIG. 1 waveguide with information added for use in analyzing propagation of light waves by application of the concepts of ray theory. It is assumed that light waves enter the core region 20 from the left. In FIGS. 2 and 3 the internal fields are resolved into two plane TEM waves 22 and 23 which reflect from the planar interface boundaries at some angle $\theta$. Electric and magnetic vectors are indicated by standard notation in FIGS. 2 and 3. There is a critical angle $\theta_c$ above which all power is reflected (total internal reflection). This angle is defined as follows:

$$\sin \theta_c = \frac{n_2}{n_1} \quad (1)$$

where $n_1$ is greater than $n_2$.

In FIG. 2 the angle $\theta_1$ is greater than $\theta_c$ so that total internal reflection does occur.

In FIG. 3 there is shown the result when propagation is at an angle such as $\theta_2$, which is smaller than $\theta_c$. At angles less than $\theta_c$ some power escapes at each reflection. This loss of power appears as an attenuation in the direction of propagation.

For any given wavelength, only certain angles of incidence $\theta$ will simultaneously satisfy the boundary conditions at both interfaces. The field configurations corresponding to propagation at these angles are termed "modes." Modes associated with incidence below the critical angle are termed "leaky" modes. For incidence above the critical angle they are known as propagating modes. Propagating modes travel along the waveguide substantially without loss. Leaky modes are attenuated as they travel along the waveguide due to the power loss at each reflection as discussed above. The magnitude of this attenuation is such that when an appreciable length of waveguide is involved, it can be said that the leaky modes do not propagate along the waveguide.

To determine the dimension d required for propagation of any particular mode at a particular wavelength, it is first noted that for a fixed critical angle there are a series of critical thicknesses $D_m$, each such thickness corresponding to a different mode of propagation. For waveguides having a dimension d larger than the critical thickness $D_m$, the mode propagates; for $d$ less than the critical thickness, the mode does not propagate.

The relation between the critical thickness $D_m$ for a given mode and the difference in the refractive indexes is:

$$D_m = \frac{\lambda m}{2\sqrt{n_1^2 - n_2^2}} \approx \frac{\lambda m}{2\sqrt{2n_1 \Delta n}} \quad (2)$$

Equation 2 indicates that the critical thickness of the core region 10 for any given mode may be increased by decreasing the difference in refractive indexes. By choosing $\Delta n$ to be small, $D_m$ may be many wavelengths even for low values of the mode number $m$. The dominant modes in the FIG. 1 waveguide correspond to $m=0$. These dominant modes will propagate in a core region 20 of any thickness. It is this property which permits the construction of large single-mode dielectric waveguides. The waveguide thickness is chosen large enough so that the dimensions are macroscopic, yet small enough so that the second and higher order modes ($m=1, 2, 3$, etc.) are leaky. The dominant modes will of course propagate in this waveguide; however, the higher order modes will be rapidly attenuated in the direction of propagation so that, as a practical matter, it is accurate to say that these higher order modes do not propagate along the waveguide.

Figure 4:
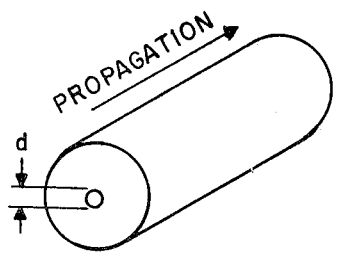
FIG. 4 is an illustration of a cylindrical optical waveguide.

Single mode waveguides can also be constructed by increasing the difference in refractive indexes and decreasing the thickness, $d$. Also, highly multimode waveguides or "light pipes" can be constructed in accordance with Equation 2 by the proper selection of thickness $d$ and the refractive index constant difference $\Delta n$. As more fully explained in the above-referenced copending application, the same basic theory of operation applies to cylindrical waveguides such as illustrated in FIG. 4 as well as optical waveguides having any selected core shape. However, design criteria will vary according to the shape of the waveguide. For example, the relationship between the various parameters of the FIG. 4 waveguide is such that:

$$D_m = \frac{\lambda m}{\pi \sqrt{n_1^2 - n_2^2}} \quad (3)$$

Figure 5:
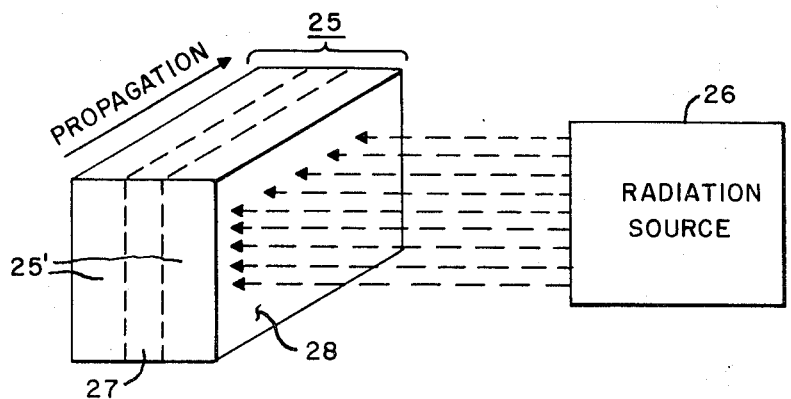
FIG. 5 illustrates a method of fabricating an optical waveguide in accordance with the present invention.

Whereas the waveguides of FIGS. 1 and 4 have generally been constructed from two separate optical dielectric materials, the present invention provides a process whereby an optical waveguide or plurality of optical waveguides can be fabricated from a single block of solid optical dielectric material. FIG. 5 is an illustration of a method for fabricating an optical waveguide from a block of solid dielectric material 25 comprising the step of changing the refractive index in a localized region 27 of the dielectric material 25 by irradiating the dielectric material 25 with a dose from the source 26 sufficient to produce a difference in refractive index between the localized region 27 and the remainder of the material 25 which permits the guiding of optical energy. The irradiation provided by source 26 can be of any type that produces a change in the refractive index of a selected localized region of the optical dielectric material with respect to the remainder of the material, such as protons, deuterons, electrons or other atomic particles. The resultant waveguide consisting of core region 27 and cladding region 25' will guide optical energy propagated in the direction illustrated.

As with prior art techniques, the fundamental waveguide parameters which must be controlled in forming a waveguide are the size and shape of the core region 27 and the difference in refractive index between the core and cladding region. These parameters determine all the propagation characteristics such as the number of propagating modes, their field pattern, phase velocity, etc. In order to achieve single mode operation in such waveguides the refractive index differences, $\Delta n$, must be very small, in the order of $10^{-2}$ to $10^{-5}$ depending on the size and shape of the core 27. To form an optical waveguide by irradiating a dielectric it is necessary therefore to determine the amount of index change introduced by the irradiation and the size and shape of the affected region. For the case of uniform irradiation of a flat surface of a material such as illustrated in FIG. 5 it is necessary to calculate the refractive index profile in a plane parallel to the incident radiation. The index profile is the plot of the refractive index as a function of the distance from the irradiated surface.

Changes in the refractive index of a dielectric material can be caused by two separate phenomena. First, ionizing radiation such as gamma rays and electrons induce absorption bands (color centers) in a material which result in an associated change of refractive index. Second, irradiation with various heavier types of atomic particles such as neutrons, protons and ions create atomic displacement in the material and thereby change the density and refractive index. Generally speaking, the change due to ionizing radiation is small and only is suitable for forming optical waveguides where only a small change in refractive index between core and cladding is desired. The refractive index change due to atomic displacements can be much larger than that due to ionization. It is possible to induce changes of proper magnitude to construct "light pipes" and single mode optical waveguides having either large or small refractive index differences.

An example of the refractive index change due to displacement occurs when a block of fused silica is irradiated with a beam of protons. Although the present invention is not limited to the use of fused silica or proton irradiation, each possesses certain desirable characteristics. For example, fused silica can be made highly homogeneous which is essential to constructing a single mode optical waveguide. Also, irradiation of fused silica causes an increase in the dielectric constant of the affected region. This is an advantage when only one or a small number of waveguides are fabricated in a piece of dielectric since in these cases it is necessary to change the refractive index in only a small portion of the material. Irradiation of many other types of optical dielectrics causes a decrease in the refractive index of the affected region. These materials can be advantageously used when fabricating a fiber optic bundle or faceplate, as discusned below, where the volume of affected material approximates the volume of unaffected material.

Protons are conveniently obtained. They are charged particles so that ionization prevents them from traveling too great a distance through the material before they create displacement. On the other hand, they have sufficient mass to cause significant displacements in the dielectric material and yet not such a large mass that the energy required to cause penetration to the desired depth is excessive. Proton irradiation produces changes in refractive index by both ionization and atomic displacement. However, the change in refractive index caused by displacements is many times greater than that due to ionization and the refractive index in the displacement region can be made significantly different from the remainder of the material. Many of these characteristics are also possessed by deuterons which also may be conveniently utilized.

The interaction of protons with fused silica can be divided into two regions, an ionization region in which the proton energy is greater than the ionization threshold energy of fused silica ($E > E_i$) and a collision region in which the proton energy is less than the ionization threshold energy ($E < E_i$). In the ionization region incident protons lose energy primarily by ionizing atoms in the fused silica, which causes, by comparison, only a slight change in the refractive index of the material. However, some energy is also given up in creating displacements in the ionization region, the cross-section for displacement creation being inversely proportional to the proton energy.

In the ionization region, the density of displacements, $N$, which is the number of displacements per cm.$^3$, for proton irradiation of fused silica is given by:

$$N = K \frac{D}{E} \qquad (4)$$

where $E$ is the proton energy in mev., $D$ is the irradiation dosage in protons per cm.$^2$, and $K$ is an empirically determined constant equal to 8000 mev. per cm. It has been determined empirically that the change in refractive index is related to the density of displacements by:

$$\Delta n = 10^{-23} N \qquad (5)$$

The change in refractive index in the ionization region is therefore given by:

$$\Delta n_i = 8 \times 10^{-20} \frac{D}{E} \qquad (6)$$

Since the proton energy is greatest at the surface of the given sample, and then decreases as the proton travels through the sample, the index change is smallest at the surface and increases with density from the surface. The ionization process stops when the proton energy falls below the threshold for ionization so the maximum refractive index change in the ionization region is given by:

$$\Delta n_{i\ max} = 8 \times 10^{-20} \frac{D}{E_i} \qquad (7)$$

For fused silica the ionization energy, $E_i$, is approximately 20 kev. Hence:

$$\Delta n_{i\ max} = 4 \times 10^{-18} D \qquad (8)$$

Figure 6:
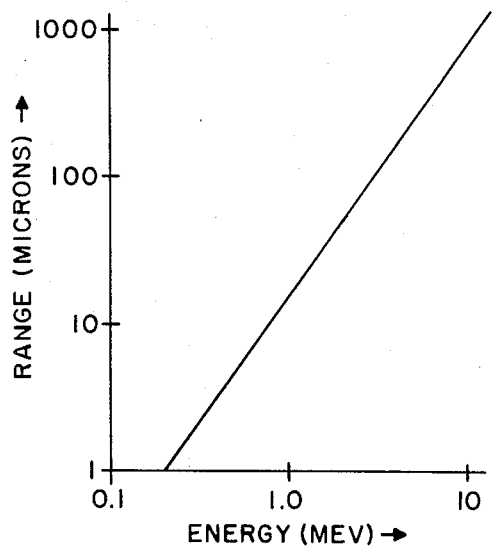
FIG. 6 is a log graph of range versus initial energy.

The distance the proton travels before stopping is the proton range. For protons whose initial energy is above 200 kev., the range is determined primarily by the rate of energy loss by ionization which is a well-known function of the target material and the proton energy. The range of protons in fused silica is plotted as a function of the initial energy in FIG. 6. It can be seen that ranges from 1 micron to several millimeters can be achieved with readily attainable energies.

At the end of the proton range the energy of each proton is equal to the ionization energy $E_i$. This remaining energy is given up through collisions with the atoms of the fused silica which create atomic displacements. The region where these displacements take place is called the collision region. The number of displacements created by each proton in this region is given approximately by $E_i/2E_d$; where $E_d$ is the displacement energy of the target material. For fused silica $E_d$ is approximately 25 electron volts so each proton creates about 400 displacements in the collision region. The total number of displacements per square centimeter in the collision region of fused silica is therefore 400$D$. It should be noted that this number is independent of the initial energy of the protons.

To determine the density of displacements, $N$, the extent of the collision region must be determined. The 400 displacements created by each proton are located in the very small region (approximately 0.1 micron long) near its stopping point. However, since the ionization process which determines the proton range is random, not all particles of the same incident energy have the same range. Rather there is a gaussian distribution of ranges about the mean range where $\sigma$, the standard deviation of the gaussian distribution is a known function of the energy. See for example, American Institute of Physics Handbook, 2nd edition, D. E. Gray, McGraw-Hill, pages 8–20 to 8–47, 1963. This phenomenon is known as range straggling. In general, the standard deviation of the range straggling is greater than the extent of the collision region for an individual particle. Therefore, the extent of the collision region for a many-particle monoenergetic beam and the distribution of displacements within that collision region are determined by the range straggling.

The consideration of range straggling indicates that a monoenergetic beam with many particles will create a displacement channel having a gaussian cross-section of standard deviation $\sigma$. The density of displacements at the peak of the gaussian channel will depend on the total number of displacements, that is approximately 400$D$ in fused silica, and the width of the gaussian channel which is proportional to $\sigma$. For normalized gaussian distribution the peak value is given by $0.4/\sigma$ so that the peak value of N in the collision region is:

$$N_{c\ max.} = \frac{0.4}{\sigma} \times 400D = \frac{160D}{\sigma} \quad (9)$$

where $\sigma$ is measured in centimeters. Applying the value of N given in Equation 5 it can be seen that the peak index change given by:

$$\Delta n_{c\ max} = 1.6 \times 10^{-21} \frac{D}{\sigma} \quad (10)$$

For a typical case where 1.5 mev. protons are incident on fused silica $\sigma$ is approximately ½ micron so:

$$\Delta n_{c\ max} \approx 32 \times 10^{-18} D \quad (11)$$

For this example, the maximum index change in the collision region is about 8 times as large as the maximum index change in the ionization region. Therefore, in this case the displacements created in the ionization region can be ignored with only a small error when calculating index profiles, so long as the dosage is below saturation.

Figure 7:
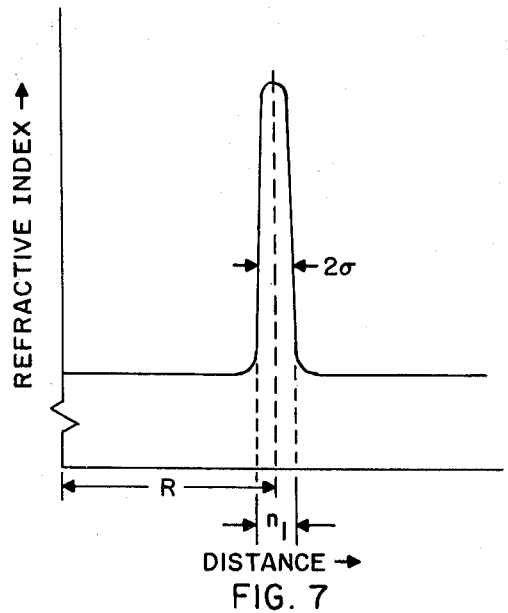
FIGS. 7, 8 and 9 illustrate three different refractive index profiles.

The index profile for a block of fused silica irradiated with a beam of monoenergetic protons is illustrated in FIG. 7. The center of the gaussian curve is a distance R from the surface where R is the mean proton range. The width of the gaussian curve is determined by the standard deviation of the range straggling $\sigma$ and is approximately equal to $2\sigma$. The maximum value of the index change is proportional to the dosage as indicated in Equation 10.

Empirical data has shown that the density of displacement increases linearly for small dosages, but for larger dosages a saturation limit is reached beyond which no further net displacements are produced. The variation of refractive index with dosage behaves in the same manner. The maximum obtainable index change for fused silica is found to be about 0.01. For other materials including some glasses a much larger change is possible. For some of these materials irradiation produces a decrease in the refractive index. Materials in which the refractive index is decreased by irradiation, such as soda-lime-silica glass, can be advantageously utilized to form optical waveguides by having the irradiation create the cladding region, rather than the core region.

Figure 8:
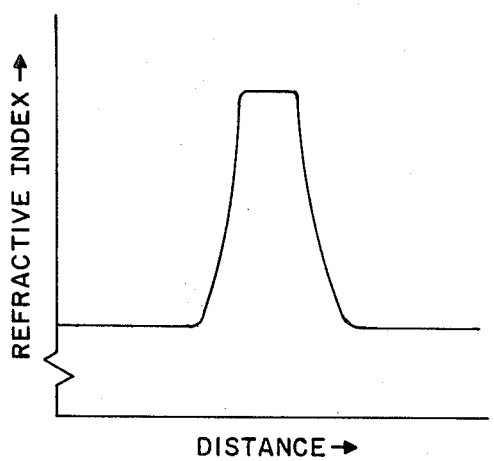

If the dosage exceeds the saturation limit, the refractive index profile is truncated at the saturation limit. This results in an index profile with a flat top and gaussian skirts as shown in FIG. 8. As the dosage is increased beyond saturation the region broadens as indicated in FIG. 8. The displacements created in the ionization region may also cause an index change which is no longer negligible. This further broadens the channel towards the surface of the sample.

It will be appreciated that the preceding discussion has considered irradiation with monoenergetic beams of identical particles. In practice, however, the typical proton beam is not perfectly monoenergetic and will generally contain various other particles such as small amounts of molecular hydrogen ions, deuterons, and other atomic particles. The effect of fluctuations in energy is to broaden the radiation induced channel. Molecular hydrogen ions in a proton beam tend to split into two protons each having half the ion energy. This will result in a second gaussian channel corresponding to a proton beam having half the intended beam energy with dosage equal to twice the hydrogen ion dosage. Heavier particles such as deuterons and tritons cause additional channels. The range and straggling for these particles are different from those for protons but the same analysis applies. For those applications where it is essential to produce a single channel or waveguide whose size and shape correspond closely to the calculated values, a precise monoenergetic proton beam substantially free of other particles can be obtained by the use of a system of momentum analyzing magnets and apertures which pass only the desired particles.

Irradiation of an optical dielectric material such as fused silica therefore is capable of producing a change in the refractive index in a localized region of the material. This phenomenon can be used in a variety of ways to produce one or more optical waveguides. For example, in FIG. 5 a collimated monoenergetic beam of proton particles directed at the surface 28 of block 25 creates a gaussian profile index change as illustrated in FIG. 7, if the dosage is kept below saturation. The region $n_2$ corresponds to the core region 27 in FIG. 5, which is parallel to and separated from the irradiated surface 28, while the remainder of the block 25 is the cladding. It will be appreciated that these figures are not drawn to scale and merely indicate the levels of different refractive index. It will also be appreciated that in this specification reference to irradiating a surface of a solid dielectric material refers to irradiation directed to the specified surface. As explained above, irradiation directed at the surface impinges upon the surface and penetrates the material to a predetermined depth dependent on the initial energy.

By keeping the dosage below saturation, the difference in refractive indexes will be small enough so that at a specified frequency the waveguide will be a single mode guide. Since the standard deviation $\sigma$ of the range straggling is small at energies around one million electron volts (mev.), the waveguide will also be small, in the order of a few microns. As illustrated in FIG. 8, dosages above saturation can be used to obtain an index profile with a flat top which can act as a waveguide. The width of this waveguide channel is dependent on dosage and more specifically on the amount of the dosage above saturation. If the dosage is just at or only slightly above saturation, it is possible to construct a single mode waveguide in the fused silica having an index profile as illustrated in FIG. 8 by making the width of the channel very narrow, in the order of 1 micron or less. However, if the dosage is greatly increased above saturation the channel will become wider, and the waveguide will become multimode.

A waveguide, such as illustrated in FIG. 5 was fabricated by irradiating a slab of fused silica with $3 \times 10^{15}$ protons per cm.$^2$ at an energy of 1.5 mev. The characteristics of the waveguide produced were determined by illuminating one end of the waveguide with a helium-neon laser parallel to the radiation induced waveguide channel and observing the pattern at the opposite end through a microscope as the illumination angle was varied. The measured width of the illuminated channel was approximately 5 microns which was substantially in agreement with the calculated value. Although the calculated value indicates that this dosage should saturate the material, producing a multimode waveguide, the resultant waveguide was a single mode waveguide. This was probably caused by the annealing of a certain portion of the change in the refractive index. Annealing results from the heat produced by the irradiation and its effects can be reduced by irradiating at a slow rate. It should also be noted that annealing can be used to precisely control the refractive index change produced. By saturating the material and then heating the dielectric to a predetermined temperature, the refractive index change can be annealed to a precise predetermined amount.

Figure 9:
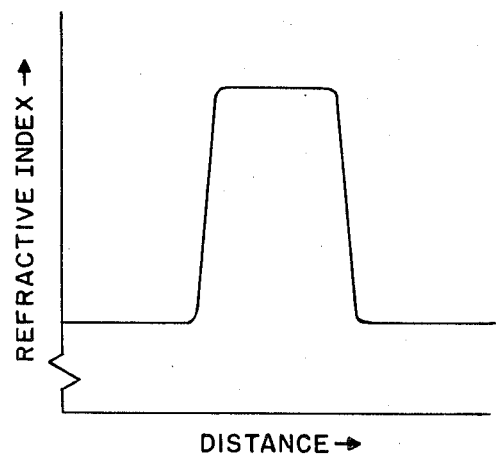

FIG. 9 illustrates a wide waveguide channel obtained by using polyenergetic irradiation. By controlling the dosage as a function of energy it is possible to obtain any index profile desired. As used in the specification "polyenergetic irradiation" and "polyenergetic beam" refer to irradiation having many different incident energy levels. This includes irradiation which has many energy levels at the same time and polyenergetic irradiation produced by gradually varying the incident energy of a substantially monoenergetic beam. Polyenergetic irradiation can be utilized to achieve a channel which is wide enough to be highly multimode. This is therefore a convenient way to construct a so-called "light pipe."

It should be noted that some care must be exercised in the amount of dosage used in irradiating the dielectric material. The localized variation in density created by heavy particle radiation introduces strain in the target material. This strain manifests itself as surface crazing and a deterioration of the waveguide performance. Experiments performed on fused silica indicate that for the irradiation conditions employed dosages up to about $10^{16}$ particles per cm.$^2$ do not cause objectionable strain. However, extensive surface crazing and uneven waveguide modes were exhibited in a sample subjected to $3 \times 10^{16}$ protons per cm.$^2$. The objectionable dosage is dependent not only on the total amount applied but also at the rate of which it is applied. Therefore, it may be possible to exceed the values expressed above if the dosage is applied more slowly.

Figure 10A:
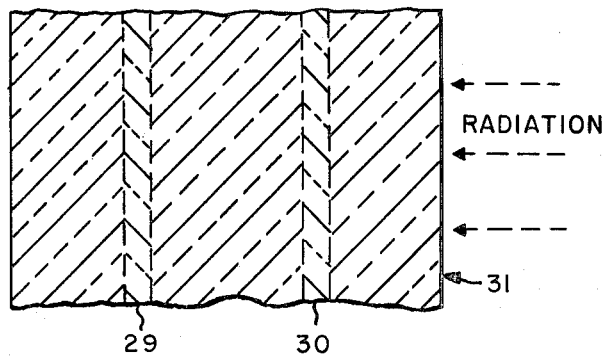
FIGS. 10a and 10b illustrate a method of fabricating two optical waveguides by irradiating at two different energy levels and the resulting refractive index profiles.
Figure 10B:
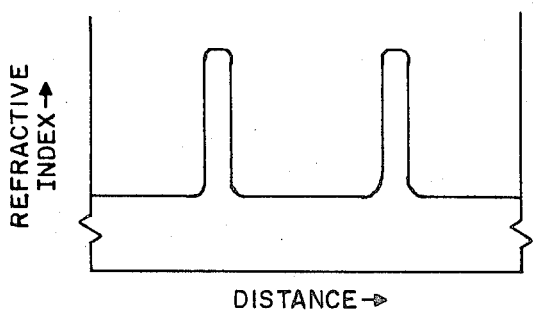

FIG. 10a is a cross-section of a dielectric block in which two discrete waveguides have been formed by irradiating the block at two discrete energy levels. FIG. 10b is the index profile that results from irradiating the surface 31 at two different energy levels. Regions 28 and 29 are regions of higher refractive index that result from irradiating the surface 31 at the separate discrete energy levels and serve as the cores of the individual waveguides. By proper design and spacing, waveguides having cores 29 and 30 can be utilized as directional couplers. In any case, the material is first irradiated at a first energy level producing one of the channels 29 or 30. The refractive index in the other of the two channels 29 and 30 is then changed by irradiating the material at a second energy level which is different from the first. This technique can be utilized to fabricate a large number of separate waveguides by irradiating at several different discrete energy levels.

Figure 11:
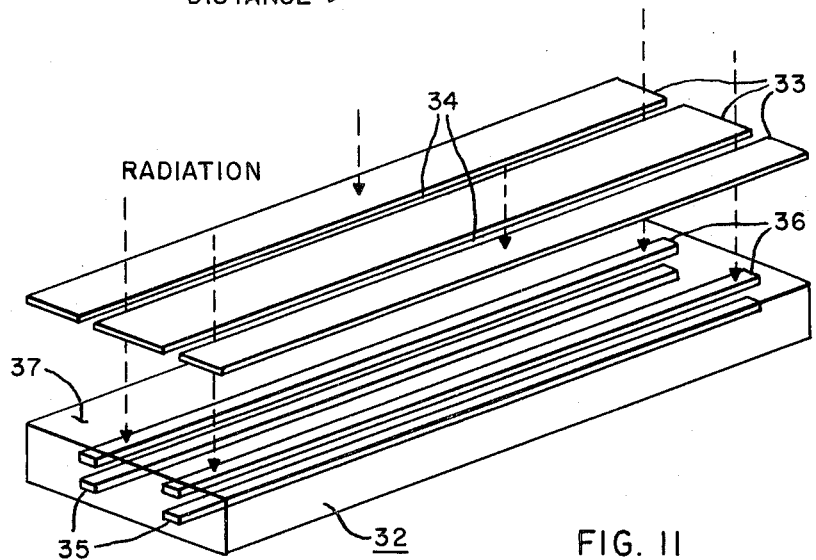
FIG. 11 illustrates a method of forming a plurality of optical waveguides by irradiating through a mask at different initial energy levels.

FIG. 11 is an illustration of a plurality of waveguides formed in a block of dielectric material 32 by the usage of a mask 33 to form distinct portions of higher refractive index in the collision region and by varying the incident energy of the proton particles in discrete steps to produce a different collision region. The opaque mask 33 has two transparent channels 34 along the length of the mask through which the radiation can pass. As used in the specification "opaque" refers to material which prevents the irradiation from reaching the dielectric material. This includes a comparatively thin sheet of heavy metal such as copper or silver or a thick mask of a material such as aluminum or even fused silica where the irradiation penetrates to a greater depth. As long as the material is thick enough to prevent the irradiation from reaching the opposite surface it can be said to be opaque. Similarly, "transparent" refers to material which permits the irradiation to propagate to the surface of the dielectric material. It includes air, and plastic, epoxy, or polystyrene or even a sheet of a heavy metal which is so thin that it does not stop the incident irradiation.

The channels 35 of higher refractive index are formed in the dielectric block 32 by irradiating the surface 37 through the transparent channels 34 in the opaque mask 32 with a proton beam whose initial energy is approximately 6 mev. The graph of FIG. 6 indicates that the collisions occur in a localized region parallel to and separated by approximately 100 microns from the irradiated surface 37. Therefore, two waveguides having cores 35 are formed approximately at a depth of 100 microns. Decreasing the initial energy to approximately 1 mev. causes the regions 36 of higher dielectric constant to be formed at the localized region parallel to and separated by approximately 10 microns from the irradiated surface 37. It can thereby be seen how one or several distinct waveguides can be formed in one block of dielectric material by the technique of irradiating one surface of the dielectric material at different discrete energy levels or by irradiating said surface through a mask which permits the protons to strike the block of dielectric material in selected channels, or a combination of both of these techniques.

Figure 12:
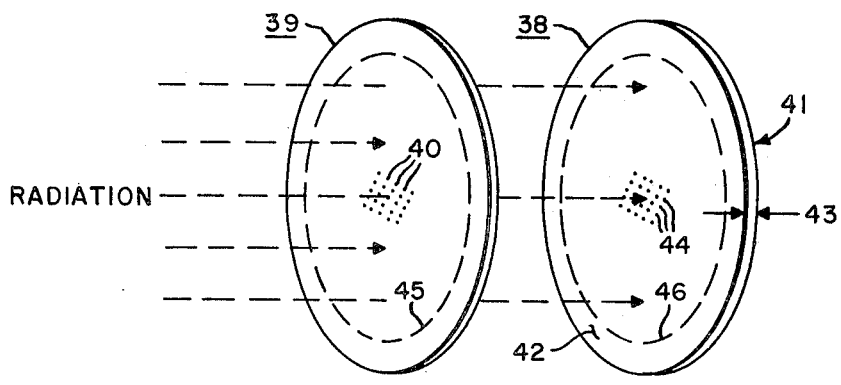
FIG. 12 illustrates a method of forming a fiber optic faceplate by sweeping the energy irradiated through a mask.

FIG. 12 illustrates a method of fabricating a plurality of optical waveguides which is particularly suitable for fabricating a fiber optic faceplate. The mask 39 is placed adjacent to the surface 42 of the dielectric material 38, which may ultimately be used as the face of a cathode-ray tube. The mask may consist of an opaque material having a plurality of closely spaced transparent openings 40 or it may consist of a transparent material having a plurality of closely spaced opaque sections 40. As explained below, the nature of the mask will depend on the characteristics of the dielectric material 38. The transparent openings or opaque sections 40 and the cores 44 are arranged over the entire mask 39 and dielectric material 38, respectively, within the dashed lines 45 and 46, but for clarity, are only shown in the center of the mask 39 and dielectric material 38.

The masked surface 42 of the material 38 is irradiated through the transparent openings in the mask 39 with a polyenergetic beam of atomic particles, such as protons. As explained above, the polyenergetic quality of the beam can be provided either by continuously varying the incident energy or by providing a beam which has many different incident energies at the same time. In either case, the irradiating beam must have the energy levels to cause a substantially uniform change in the refractive index through the entire thickness 43 of the dielectric material 38, from the irradiated surface 42 to the opposite surface 41.

If the dielectric material 38 is one, such as fused silica, in which irradiation causes an increase in the refractive index, the mask 39 is an opaque material with a plurality of transparent openings 40. The polyenergetic irradiation through the transparent openings 40 only affects the regions 44 having the corresponding cross-sectional areas and causes an increase in the refractive index of these regions through the entire thickness 44 of the material 38. Each of the regions 44 forms the core of an optical waveguide while the unaffected portion of the material 38 is the cladding.

If the dielectric material is one, such as soda-lime-silica glass, in which irradiation causes a decrease in the refractive index, the mask 39 is an opaque material such as thin plastic or epoxy in which is imbedded a plurality of closely spaced opaque sections 40. Irradiation through the transparent portion of the mask 39 affects all of dielectric material 38 except the cores 44, whose cross-sectional areas correspond to the opaque sections 40. The refractive index in the affected region is decreased through the entire thickness 43 of the material 38 by the polyenergetic irradiation, while the opaque sections 40 in the mask prevent the irradiation from having any affect in the core regions 44. Each of the regions 44 therefore has a higher refractive index and forms the core of an optical waveguide while the affected portion of the dielectric material is the cladding.

The spacing and size of the transparent holes or opaque sections 40 depends on the particular usage of the faceplate. Commonly the waveguides in fiber optic faceplates are highly multimode "light pipes" so that the diameter of the sections or openings 40 would be in the range from twenty-five to one hundred microns. However, for a particular application, it may be desirable to have single mode waveguides requiring sections or holes 40 as small as one micron in diameter. For the case where the sections 40 are comparatively large transparent holes, the mask 39 can be fabricated by conventional drilling techniques. Where the holes must be in the order of one to twenty-five microns, conventional drilling is not practical but the mask can be fabricated by vacuum deposition, electroetching, electroforming, or by the use of a laser to "drill" the holes. Small opaque sections 40 can similarly be provided.

Generally the waveguides in a faceplate are tightly packed to provide good resolution. However, care must be taken to avoid excessive coupling between the waveguides. Within these guidelines, faceplates are generally constructed where the cores and cladding occupy approximately the same value. More exactly, the cores occupy from twenty-five to eighty percent of the faceplate. In FIG. 12, therefore, the transparent holes or opaque sections 40 occupy from twenty-five to eighty percent of the cross-sectional area of the usable portion of the mask 39.

What is claimed is:

1. The method of fabricating an optical waveguide comprising:
the step of providing a single continuous quantity of solid optical dielectric material, and the step of changing the refractive index in an interior localized region of said dielectric material by irradiating the the dielectric material so as to produce atomic displacements in said localized region, with a dose sufficient to produce a difference in refractive index between said interior localized region and the remainder of said material which permits the guiding of optical energy.

2. The method specified in claim 1 in which the refractive index in said localized region is changed by irradiating said dielectric material with heavy atomic particles causing a change in the density of the material in said localized region.

3. The method specified in claim 2 in which one surface of said dielectric material is irradiated with protons for changing the refractive index in a narrow localized region of the material parallel to and separated from the irradiated surface.

4. The method specified in claim 2 in which one surface of said dielectric material is irradiated with deuterons for changing the refractive index in a narrow localized region of the material parallel to and separated from the irradiated surface.

5. The method specified in claim 2 in which said solid optical dielectric material is fused silica and in which one surface of a quantity of said fused silica is irradiated with a collimated beam of protons for increasing the refractive index in a narrow localized region of the fused silica parallel to and separated from the irradiated surface.

6. The method of fabricating an optical waveguide comprising:
the step of providing a single continuous quantity of solid optical dielectric material;
the step of providing a source of radiation;
the step of masking the surface of said dielectric material to be irradiated with an opaque mask having a transparent channel along the length of the mask;
and the step of changing the refractive index in a channel, corresponding to the channel in said mask, of an interior localized region of said dielectric material by irradiating the material so as to produce atomic displacements in said localized region, with a dose sufficient to produce a difference in refractive index between said interior localized region and the remainder of said material which permits the guiding of optical energy.

7. The method specified in claim 6 in which the refractive index is changed by irradiating the masked surface with a collimated beam of protons.

8. The method specified in claim 6 in which said solid optical dielectric material is fused silica and the refractive index in said channel is increased by irradiating the masked surface of the fused silica with a collimated beam of protons.

9. The method specified in claim 6 in which the opaque mask has a plurality of transparent channels along the length of the mask and in which the refractive index is changed in a plurality of channels, corresponding to the channels in said mask, of an interior localized region of the dielectric material by irradiating the masked surface of the material so as to produce atomic displacements in said localized region, with a dose sufficient to produce a difference in refractive index between said localized regions and the remainder of the material which permits the guiding of optical energy by each of said channels.

10. The method of fabricating a plurality of optical waveguides from a single continuous quantity of solid optical dielectric material comprising:
the step of changing the refractive index in a first interior localized region of a single continuous quantity of solid optical dielectric material by irradiating one surface of the dielectric material at a first energy level so as to produce atomic displacements in said localized region, with a dose sufficient to produce a difference in refractive index between said interior localized region and the remainder of said material which permits the guiding of optical energy;
and the step of changing the refractive index in at least one additional interior localized region by irradiating said surface of the dielectric material at, at least, one energy level different from said first energy level so as to produce atomic displacements in said additional interior localized region, with a dose sufficient to produce a difference in refractive index in said additional interior localized regions and the surrounding portions of said material which permits the guiding of optical energy.

11. The method specified in claim 10 in which the refractive index in said localized regions is changed by irradiating one surface of the dielectric material with a collimated beam of protons.

12. The method specified in claim 10 for fabricating a plurality of optical waveguides in which said solid optical dielectric material is fused silica and in which the refractive index in said localized regions of a single continuous quantity of fused silica is increased by irradiating one surface of the fused silica with a collimated beam of protons.

13. The method of fabricating a plurality of fiber optic waveguides from a single continuous quantity of solid optical dielectric material comprising:
the step of masking one surface of said dielectric material with an opaque material having a plurality of transparent openings:
and the step of irradiating the masked surface of said dielectric material through the plurality of transparent openings with a polyenergetic collimated beam of atomic particles for increasing the refractive index in a plurality of cylindrical cores, whose cross-sections correspond to the openings in the opaque mask, extending from the irradiated to the opposite surface of the dielectric material.

14. The method of fabricating a fiber optic faceplate as specified in claim 13 in which said dielectric material has the shape of a plate suitable for forming the face of a cathode-ray tube, the opaque masking material is placed over a wide surface of said dielectric material, the openings in the opaque material are substantially circular holes having a common diameter in the range from one to one hundred microns, said holes comprise from twenty-five to eighty percent of the cross-sectional area of the mask and the masked surface is irradiated with a collimated beam of heavy atomic particles causing a change in the density of the material in said cylindrical cores.

15. The method specified in claim 14 in which the masked surface is irradiated with a collimated beam of protons.

16. The method specified in claim 13 in which the masked surface is irradiated with a collimated beam of electrons.

17. The method of fabricating a plurality of fiber optic waveguides from a single continuous quantity of solid optical dielectric material comprising:
the step of masking one surface of said dielectric material with a mask consisting of a transparent material in which is imbedded a plurality of closely spaced opaque sections;

and the step of irradiating the masked surface of said dielectric material through the transparent portion of the mask with a polyenergetic collimated beam of atomic particles for decreasing the refractive index, from the irradiated to the opposite surface of the dielectric material, in the portion of the material corresponding to the transparent portion of the mask, with respect to a plurality of cylindrical cores whose cross-sections correspond to the opaque portions of the mask.

18. The method of fabricating a fiber optic faceplate as specified in claim 17 in which said dielectric material has the shape of a plate suitable for forming the face of a cathode-ray tube, the mask is placed over a wide surface of said dielectric material, the opaque sections of the mask have a substantially circular cross-section having a common diameter in the range of from one to one hundred microns and the opaque sections comprise from twenty-five to eighty percent of the cross-sectional area of the mask and the masked surface is irradiated with a collimated beam of heavy atomic particles causing a change in the density of the irradiated portion of the material.

19. The method specified in claim 18 in which the masked surface is irradiated with a collimated beam of protons.

20. The method specified in claim 17 in which the masked surface is irradiated with a collimated beam of electrons.

21. The method of fabricating a plurality of optical waveguides from a single continuous quantity of solid optical dielectric material, comprising:

the step of masking the surface of a quantity of a single continuous quantity of solid optical dielectric material with an opaque mask having a transparent channel along the length of the mask;

the step of changing the refractive index in a first interior localized region of said optical material, corresponding to the transparent channel in said mask, by irradiating the masked surface of said optical material at a first energy level so as to produce atomic displacements in said localized region, with a dose sufficient to produce a difference in refractive index between the interior localized region and the remainder of said material which permits the guiding of optical energy;

and the step of changing the refractive index in at least one additional interior localized region, corresponding to the transparent channel in said mask, by irradiating the masked surface of said dielectric material at, at least, one energy level different from said first energy level so as to produce atomic displacements in said additional localized region, with a dose sufficient to produce a difference in refractive index in said additional interior localized region and the surrounding portion of said material which permits the guiding of optical energy.

References Cited

UNITED STATES PATENTS

| 2,746,193 | 5/1956 | Billian | 65—111 |
| 3,323,886 | 6/1967 | Hays | 65—4 |
| 3,366,467 | 1/1968 | Ohnishi | 65—111 |
| 3,386,787 | 6/1968 | Kaplan | 350—96 |

S. LEON BASHORE, Primary Examiner

E. R. FREEDMAN, Assistant Examiner

U.S. Cl. X.R.

65—3, 4, 33; 350—96; 333—95